United States Patent
Aslan

[15] 3,668,521
[45] June 6, 1972

[54] ZERO TEMPERATURE DRIFT ELECTROTHERMIC UNITS

[72] Inventor: Edward E. Aslan, Plainview, N.Y.
[73] Assignee: The Narda Microwave Corporation, Plainview, N.Y.
[22] Filed: June 22, 1970
[21] Appl. No.: 48,288

[52] U.S. Cl................................................324/106, 324/95
[51] Int. Cl..........................................G01r 5/22, G01r 21/00
[58] Field of Search..............................................324/95, 106

[56] References Cited

UNITED STATES PATENTS

| | | | |
|---|---|---|---|
| 3,384,819 | 5/1968 | Rinkel | 324/95 |
| 3,237,101 | 2/1966 | Vaughan | 324/95 |
| 3,147,436 | 9/1964 | Hopfer | 324/106 X |
| 3,421,081 | 1/1969 | Schneider | 324/95 |

Primary Examiner—Rudolph V. Rolinec
Assistant Examiner—Ernest F. Karlsen
Attorney—Robert R. Strack and James A. Eisenman

[57] ABSTRACT

An electrothermic unit comprising two thin film thermocouples mounted in a coaxial transmission line relative to location and the thermal resistive distributions thereof, such that the sum of the hot junction temperatures is substantially equal to the sum of the cold junction temperatures.

5 Claims, 3 Drawing Figures

PATENTED JUN 6 1972  3,668,521

INVENTOR
EDWARD E. ASLAN

BY Eisenman and Strack
ATTORNEYS

3,668,521

ZERO TEMPERATURE DRIFT ELECTROTHERMIC UNITS

FIELD OF THE INVENTION

This invention relates to electrothermic units; and more particularly to the utilization of thermocouples in conjunction with the measurement of electrical wave energy.

DESCRIPTION OF THE PRIOR ART

It has been long known that bolometer elements such as barettas and thermistors may be used as power-sensitive elements for the measurement of microwave power. These rather delicate elements are arranged to present a good impedance match to the coaxial line which they terminate, and they must be mounted to provide a direct current conduction path to the external metering circuit.

It has more recently become apparent that thermocouples may advantageously be employed for measuring microwave energy. Typically, the thermocouple is formed of a junction between resistive strips of two dissimilar thin metal films which are connected between inner and outer conductors of a coaxial line or waveguide. A portion of the resistive strip on each side of the junction is located within the electromagnetic field of the wave energy to be measured, and consequently absorbs energy from the field. The absorbed energy is effective to elevate the temperature of the junction of the thermocouple in dependence upon the strength of the field. By making the thermo-electric elements of thin film, one can obtain a response that is relatively independent of frequency.

One advantage of electrothermic power meters as opposed to direct reading thermistor power meters, is their relative freedom from zero drift with ambient temperature changes. With thermistor or bolometer power meters, drift is a direct function of ambient temperature. In electrothermic power meters, the drift is not a function of the ambient temperature per se, but of the difference in temperature across the thermoelectric elements. In other words, it is a function of the difference in temperature between the inner and outer conductor of the electrothermic unit.

When an electrothermic power meter is immersed in a constant ambient temperature environment for a relatively long period of time, such that both inner and outer conductors, as well as all other parts, are at one uniform temperature, the electrothermic output voltage with no RF power applied will be essentially zero. If such an electrothermic unit is then placed in a different constant ambient temperature environment, it is likely that a zero drift will occur during the period of time that the inner and outer conductors are at different temperatures. After a sufficient period of time, both inner and outer conductors will attain the new ambient temperature and the zero drift voltage will again be reduced to zero. This uniformity of temperature is an ideal condition which in practice is rarely, if ever, achieved.

In recognition of the fact that one cannot always wait until the inner and outer conductors of a unit have reached a uniform temperature level, attention has been given to specially designed mounts which minimize the effect of temperature difference. The hot and cold junctions of such mounts are positioned in accordance with electric and thermal conductivity criteria. In general, all of the cold junctions are mounted in good heat transfer contact with an isothermal mass which is subject to slow variation in temperature as the ambient temperature changes. Where the inner cold junction and the outer cold junction are both associated with isothermal masses, the temperature of the hot junction which is located between the two masses, corresponds to the average temperature of the two masses and there is a zero output from the thermopile in the absence of any microwave energy. One prior art teaching indicates that all of the cold junctions must be properly positioned beyond the boundaries of the electromagnetic field and have good thermal contact with appropriate isothermal masses, while the hot junctions are located within the electromagnetic field. Another prior art teaching, indicates that both the hot and the cold junction portions of a thermocouple must be located within the boundaries of the electromagnetic field.

In contrast with these earlier teachings, the present invention provides design criteria which render it possible and sometimes desirable to provide a drift free thermocouple mount wherein the hot junctions are within the microwave field and wherein some of the cold junctions only, are located beyond the boundaries thereof.

SUMMARY OF THE INVENTION

It is possible, by proper design, to reduce substantially the zero drift associated with a changing ambient temperature and/or make an electrothermic unit essentially independent of the ambient temperature gradient across a thermocouple element. The present invention is directly concerned with the provision of a drift free thermocouple mount.

It is an object of the present invention to provide an improved thermocouple mount subject to minimum drift under varying ambient temperature conditions.

Another object of the invention is to provide an improved thermocouple mount wherein it is not necessary to position cold junctions of the thermocouple either all inside or all outside of the boundaries of an electromagnetic field being measured.

Another object of the invention is to provide an improved thermocouple mount offering relative ease and convenience in manufacturing.

Still another object of the invention is to provide an improved electrothermic power meter wherein there is a minimum of heat loss from the junction due to conduction and wherein a maximum sensitivity is attained.

The objects recited above, as well as additional objects and features of the invention, will be more fully understood and appreciated from the following description which is taken in conjunction with the drawings.

DESCRIPTION OF THE PREFERRED EMBODIMENT

Figure 1:
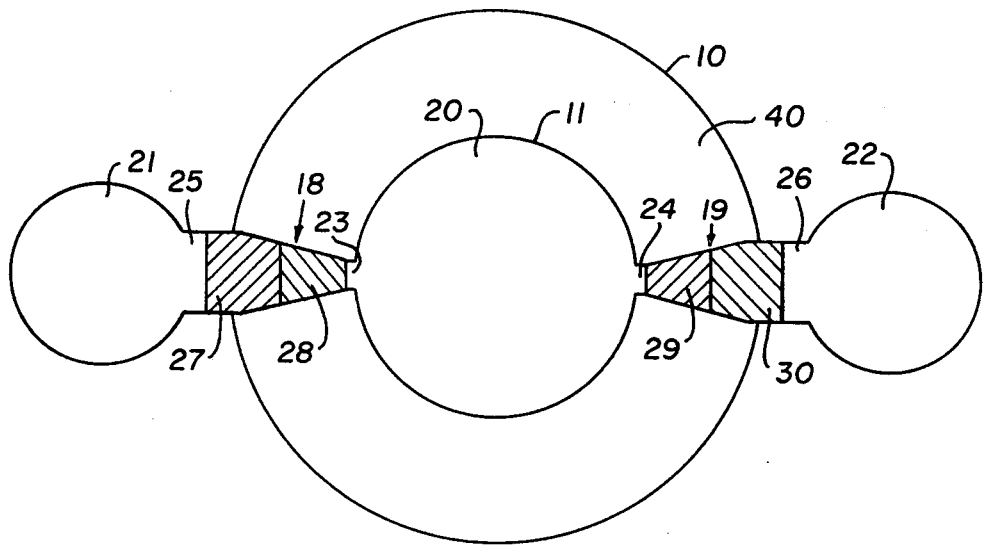
FIG. 1 is a schematic diagram showing the main elements in a thermocouple disposed within a perpendicular plane through a coaxial line or waveguide cavity.

FIG. 1 illustrates a plurality of conductors disposed across a gap 40 which will contain the electromagnetic field to be measured. The solid line 10 denotes the outer boundary of the electromagnetic field that is normally established by the outer conductor of a cavity. The line 11 denotes the inner boundary of the electromagnetic field and it will be seen to be primarily coincident with the outer edge of an inner conductor 20. Two thermocouples, 18 and 19, are disposed on a substrate across diametrically opposed portions of the gap 40. These thermocouples are made up of thin film strips of antimony 27, 29 and bismuth 28, 30. On each side, the thermocouples overlap a film of silver or similar high conductivity metal. These areas are illustrated by the numerals 21, 20, and 22. It will be understood that the particular materials mentioned have been found to provide optimum results; however, other materials known to those skilled in this field will become immediately apparent. Projecting portions 25 and 26 are provided in association with the outer conductor, and projections 23 and 24 are provided in association with the inner conductor in order to facilitate assembly and fabrication.

Figure 2:
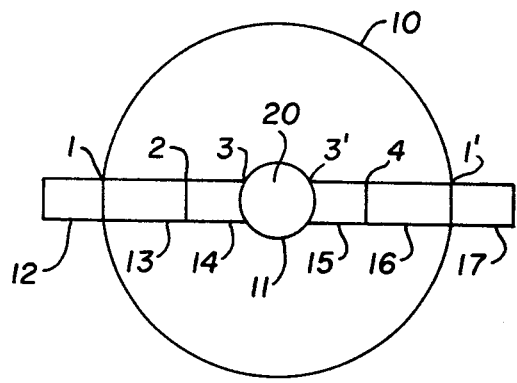
FIG. 2 is a schematic diagram useful in explaining the principles of the present invention.
Figure 3:
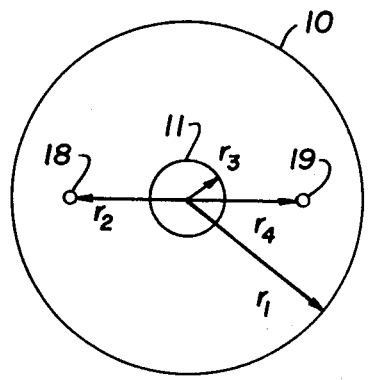
FIG. 3 is a schematic illustrating the relative positioning of hot and cold junctions in accordance with the design criteria of the invention.

FIGS. 2 and 3 have been prepared to assist in explaining the theory of the present invention which is believed to be responsible for the unique results attained. The schematic in FIG. 2 comprises metal film strips 12-17 located on a diametric chord across the cavity formed by the inner surface 10 of an outer conductor. Strips 12 and 17 may be considered to be silver, strips 13 and 15 may be considered to be antimony, strips 14 and 16 may be considered to be bismuth, and the inner conductor 20 may also be considered to be silver. The illustrated arrangement forms two hot junctions, 2 and 4, and the four cold junctions, 1, 1', 3, and 3'. Since isothermal masses will be employed in contact with the inner and outer conductors, the outer cold junctions, 1 and 1', will be maintained at the same temperature and the inner cold junctions, 3 and 3', will also be maintained at the same temperature.

The thermocouple mount will be independent of drift due to variation in temperature between the outer and inner conductors if $$T_2 + T_4 = T_1 + T_3 \quad (1)$$

where T indicates the temperature appearing at the junctions identified by the subscripts.

In order to establish this condition, one may consider the hypothetical situation wherein a strip of platinum, or other metal, is interposed between each of the materials, making up the thermocouple. The platinum, or reference metal, is to have the temperature of the junction throughout its length. Thus, the presence of the platinum may be disregarded since it would contribute no voltage and the polarity of the thermocouple voltage of each material relative to its position at the junction is established. One combines the electrothermic output voltages relative to the reference metal platinum, for each material at each junction. The voltages are added to the total voltage if the material is to be left of the junction and subtracted from the total if the material is to the right of the junction. Thus the electrothermic output voltage E, $$E = ST_1 - AT_1 + AT_2 - BT_2 + BT_3 - ST_3 + ST_3 - AT_3 + AT_4 - BT_4 + BT_1 - ST_1 \quad (2)$$

where
- $A$ = electrothermic coefficient of antimony relative to platinum in volts/degree C.
- $B$ = electrothermic coefficient of bismuth relative to platinum in volts/degree C.
- $S$ = electrothermic coefficient of silver relative to platinum in volts/degree C.

By combining terms, Equation (2) becomes:

$$E = A(T_2 + T_4 - T_3 - T_1) + B(T_3 + T_1 - T_2 - T_4) \quad (3)$$

It will be apparent that if Equation (1) is satisfied, $E$ = zero, and accordingly there is no drift. In other words, when the sum of the hot junction temperature is equal to the sum of the cold junction temperature, there is no electrothermic output voltage.

The temperatures $T_2$ and $T_4$ can be determined as a function of $T_3$, and $T_1$, and the thermal resistances between the junctions, in the following fashion.

The output voltage E, in terms of temperature $T_1$, and $T_3$, and thermal resistance between the junctions may be expressed:

$$E = A \left[ \frac{(T_1 - T_3)R_2}{(R_1 + R_2)} + \frac{(T_1 - T_3)R_3}{(R_3 + R_4)} + T_3 - T_1 \right]$$

$$+ B \left[ \frac{(T_3 - T_1)R_2}{(R_1 + R_2)} + \frac{(T_3 - T_1)R_3}{(R_3 + R_4)} + T_1 - T_3 \right] \quad (4)$$

where R indicates the thermal resistance between the junctions identified by the subscripts.

In order to simplify Equation (4), let $$K_1 = R_2/R_1 + R_2 \text{ and } K_2 = R_3/R_3 + R_4 \quad (5)(6)$$

then: $E = (T_1 - T_3)(A - B)(K_1 + K_2 - 1) \quad (7)$

If $K_1$ plus $K_2$ is equal to 1, the thermocouple unit will be independent of drift due to ambient or environmental temperature changes.

For the condition where the resistance of the substrate is very much less than the thermal resistance of the thin film deposited elements, the thermal resistances $R_1, R_2, R_3, R_4$ will be determined only by the substrate. For homogeneous substrate material, the constants $K_1$ and $K_2$ can be determined in terms of the radii of the inner conductor, outer conductor, and hot junctions. Reference is made to FIG. 3, wherein the radii of the various junctions are illustrated. Cold junctions 3, 3' are located at a radius of $r_3$ from the center; hot junctions 2 and 4 are located at radii $r_2$ and $r_4$ respectively, from the center; and cold junctions 1, 1' are located at a radius $r_1$ from the center.

According to Fourier's equation, $$Q = -CA(dt/dr) \quad (8)$$

where: $Q$ = heat transferred across a surface A, $t$ is the temperature, and $r$ is the length of a material having C thermal conductivity.

For unit length, $$Q = -2\pi r C \left(\frac{dt}{dr}\right) \quad (9)$$

$$\int_{T_2}^{T_3} dt = \frac{Q}{2\pi C} \int_{r_2}^{r_3} \frac{dr}{r} \quad (10)$$

Solving for $T_2 - T_3$ yields:

$$T_2 - T_3 = \frac{Q}{2\pi C} \log_e \frac{r_2}{r_3} \quad (11)$$

Similarly:

$$T_1 - T_3 = \frac{Q}{2\pi C} \log_e \frac{r_1}{r_3} \quad (12)$$

$$T_4 - T_3 = \frac{Q}{2\pi C} \log_e \frac{r_4}{r_3} \quad (13)$$

$K_1$ and $K_2$ may be defined again in terms of temperature, thus:

$$K_1 = \frac{(T_2 - T_3)}{(T_1 - T_3)} = \frac{\log_e \frac{r_2}{r_3}}{\log_e \frac{r_1}{r_3}} \quad (14)$$

$$K_1 = \frac{(T_4 - T_3)}{(T_1 - T_3)} = \frac{\log_e \frac{r_4}{r_3}}{\log_e \frac{r_1}{r_3}} \quad (15)$$

For the conditions that exist in an electrothermic element in which the thermal conductivity of the substrate is very much greater than that of the thin film thermocouple, we can establish the location of the hot junctions. From Equation (7), if we make $K_1 = K_2 = 0.5$, a zero drift condition will be satisfied. In a coaxial mount with a 0.276 of an inch outer conductor diameter and a 0.120 of an inch inner conductor diameter the hot junction radius is determined from Equations (14) and (15) as 0.091 of an inch.

Throughout the preceding discussion it has been assumed that the thermal resistance of the substrate was very much less than the thermal resistance associated with thin metal strips of the thermocouple element. When this condition is not present the design may be considerably more complicated. To avoid this complication, it is desirable to make the thermal resistive distribution of the element coincident with that of the substrate.

A single value of $K_1$ independent of the magnitude of substrate or element thermal resistivity can be achieved by making the relative distribution of thermal resistance of the element the same as that of the substrate. This results in effectively paralleling two thermal dividers having the same division ratio $K_1$, but of different total resistance.

The electrical resistivity is generally used to control the thickness of the deposited films. The following relationship between electrical and thermal resistivity will establish deposited resistance of the evaporated films. The thermal resistance of the substrate, $R_s$, between concentric circles, may be expressed:

$$R_s = Q/2\pi C (\log_e r - \log_e r_0) \quad (16)$$

where:
$r_0$ = the radius of a reference circle
$r$ = the radius of a second circle The electrical resistance, $R_e$, of the thin film element of unit thickness $$R_e = \rho \frac{(r - r_0)}{W} \quad (17)$$

where: $W$ = the width of the element
$\rho$ = a proportionality constant of the material, i.e., the electrical resistivity of the material $$dR_s/dr = (Q/2\pi C) \cdot (1/r) \quad (18)$$

and $$(dR_e/dr) = (\rho/W) \quad (19)$$

equating the two expressions $$W/r = (2\pi CP/Q) = K_3 \quad (20)$$

For a thin film element to have the same resistive distribution as its substrate the width of the element at any point should be proportional to the radius at that point. This is shown, for example, in FIG. 1.

It may be assumed that:

$$(\rho t / \rho st) = \rho / \rho s \quad (21)$$

Where:
$\rho st$ = thermal sheet resistance per square unit
$\rho t$ = thermal resistivity
$\rho s$ = electrical sheet resistance per square unit
$\rho$ = electrical resistivity Letting the superscripts "a" and "b" identify the materials antimony and bismuth, respectively:

$$\rho_{st}{}^a = \rho_{st}{}^b \quad (22)$$

$$\rho_t{}^a \frac{\rho_s{}^a}{\rho^a} = \rho_t{}^b \frac{\rho_s{}^b}{\rho^b} \quad (23)$$

$$\frac{\rho_s{}^a}{\rho_s{}^b} = \frac{\rho_t{}^b}{\rho_t{}^a} \frac{\rho^a}{\rho^b} \quad (24)$$

Values for $\rho$ and $\rho_t$ for the materials of the thermocouple may be obtained from standard references. Where antimony and bismuth are used $$\rho s^a / \rho s^b = 0.759 \quad (25)$$

In other terms, the electrical sheet resistance of the antimony will be equal to 0.759 times that of the bismuth.

The electrical resistance, $R$, from a hot junction to a cold junction is $$R = \rho_s \int_{r_1}^{r_2} \frac{dr}{W} = \frac{\rho_s}{K_3} \int_{r_1}^{r_2} \frac{dr}{r} \quad (26)$$

Solving for $\rho_s$ yields $$\rho_s = \frac{RK_3}{\log_e \frac{r_2}{r_1}} \quad (27)$$

Using these equations and assuming a 50 ohm RF impedance, an exemplary thermocouple mount would comprise:
$R_a = 43.15$ ohms, $K_3 = 0.1$, $r_1 = 0.06$ of an inch
$r_2 = 0.091$ of an inch
Thus,
$\rho_s{}^a = 23.85$ ohms/square unit
$R_B = 56.85$ ohms, $K_3 = 0.1$, $r_1 = 0.06$ of an inch,
$r_2 = 0.091$ of an inch
Thus,
$\rho_s{}^b = 31.43$ ohms/square unit It will be appreciated that the solutions given are of a steady state nature and do not account for all transient conditions of temperature change. In order to prevent transient drifts from occuring, it is desirable to limit the rate at which the temperature gradients occur. This may be accomplished by use of thermal low pass filters or, more simply, by large thermal capacity mounts.

The discussions and descriptions presented hereinabove were presented as criteria for designing drift free thermocouple mounts. It is appreciated that those skilled in the art will recognize certain modifications in these criteria and all such modifications which fall within the spirit and teachings of this invention are intended to be covered in the following claims.

What is claimed is:

1. An electrothermic unit for measuring microwave energy comprising a coaxial transmission line having spaced coaxial conductive surfaces, first and second thin film thermocouples each connected between said surfaces and each having a hot junction in the space between said surfaces and a cold junction proximate each of said surfaces and mounted such that the inner cold junctions of said thermocouples are located at a radium $r_3$ from the center axis, the outer cold junctions are located at a radius $r_1$ from said axis, and said hot junctions are located at radii $r_2$ and $r_4$, respectively, from said axis, said thermocouples being located such that $\log_e r_4/r_3 + \log_e r_2/r_3 = \log_e r_1/r_3$.

2. An electrothermic unit as defined in claim 1, wherein said thermocouples are mounted on a substrate and the thermal resistive distribution of said substrate and said thermocouples is substantially equal.

3. An electrothermic unit as defined in claim 2, wherein said substantial equality is established by selectively shaping the thin films of said thermocouples.

4. An electrothermic unit as defined in claim 2, wherein the width of the thin film of said thermocouples at any radial position is proportional to the radius at that position.

5. An electrothermic unit as defined in claim 1, wherein $r_1$ is the inner radius of the outer coaxial conductive surface and $r_4$ is the outer radius of the inner coaxial conductive surface.

* * * * *

UNITED STATES PATENT OFFICE
CERTIFICATE OF CORRECTION

Patent No. 3,668,521      Dated June 6, 1972

Inventor(s) Edward E. Aslan

It is certified that error appears in the above-identified patent and that said Letters Patent are hereby corrected as shown below:

Column 4, line 45, equation (15)

$$\text{should be } K_2 = \frac{(T_4 - T_3)}{(T_1 - T_3)} = \frac{\log_e \frac{r_4}{r_3}}{\log_e \frac{r_1}{r_3}}$$

Column 6, line 10, should be $\rho_s a = 23.86$ ohms/square unit

Column 6, line 34 after "proximate" insert --to--

Signed and sealed this 26th day of September 1972.

(SEAL)
Attest:

EDWARD M. FLETCHER, JR.
Attesting Officer

ROBERT GOTTSCHALK
Commissioner of Patents